Patented Nov. 10, 1925.

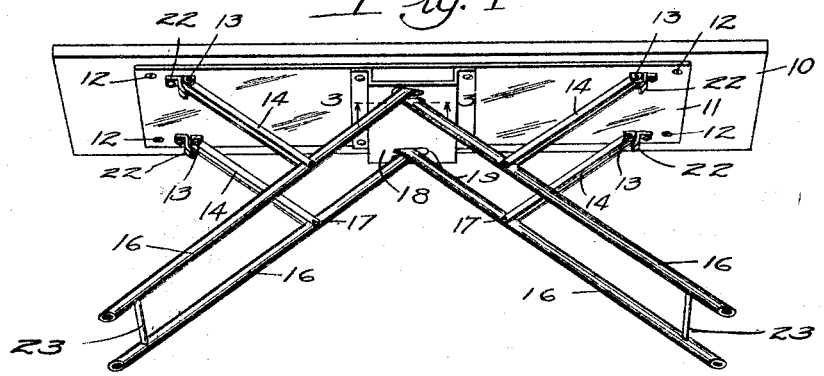
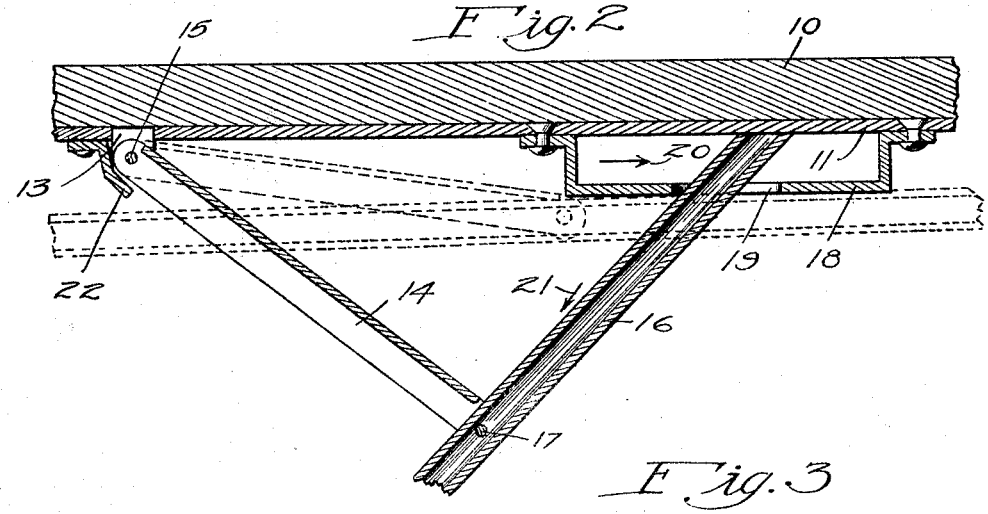
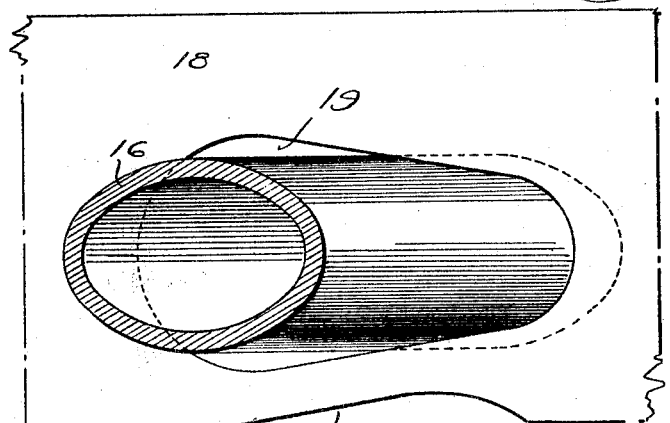

1,560,912

UNITED STATES PATENT OFFICE.

ERNEST S. JOHNSON, OF WEBSTER CITY, IOWA.

LEG-LOCKING STRUCTURE.

Application filed December 9, 1922. Serial No. 605,936.

*To all whom it may concern:*

Be it known that I, ERNEST S. JOHNSON, a citizen of the United States, and a resident of Webster City, in the county of Hamilton and State of Iowa, have invented a certain new and useful Leg-Locking Structure, of which the following is a specification.

The object of my invention is to provide a leg locking structure for supporting elements, which is of simple, durable and comparatively inexpensive construction.

More particularly, my invention relates to a type of leg locking structures wherein a supporting leg may be secured to a supporting element by a pivotal connection at one point and projected into a receiving element at its upper end for securely holding the leg to the supporting element.

Still a further object is to provide a leg locking structure, wherein the leg may be moved to position substantially parallel with the underside of the supporting element for occupying a minimum amount of space, the parts of the structure being so arranged that when the leg is in operative position and pressure is applied on the supporting element, it will become more firmly locked as the pressure increases.

Still a further object is to provide the receiving element for the upper end of the leg with a wedge-shaped opening, so that the upper end of the leg will be frictionally gripped and held against any sideward movement.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view, showing my leg locking structure applied to a supporting element.

Figure 2 is a sectional view taken through the receiving member, showing the leg in locked position; and Figure 3 is a sectional view taken on the line 3—3 of Figure 1, showing the leg in locked position.

In the accompanying drawings, I have used the reference numeral 10 to indicate generally a supporting element, which may be of any desired outline.

Secured to the underside of the supporting element 10 is a plate 11, preferably made of metal. The plate 11 is secured to the supporting element 10 by means of screws or the like 12.

Formed in the plate 11 near the ends thereof are the pairs of ears 13. The ears 13 are arranged in pairs and the ears of each pair are slightly spaced apart for receiving therebetween a link or brace 14.

The upper end of the link 14 is secured to the ears 13 by means of a pivot pin 15. The link 14 is channel-shaped in cross section, so that a great amount of strength is had.

A portion of the lower end of the link 14 is cut away, so as to form a pair of spaced, receiving ears, which project on each side of the leg 16 and are secured thereto by a pivot pin 17.

The leg 16 is preferably formed of sheet metal tubing.

By forming the legs 16 of tubing, I am able to secure the maximum of strength with a minimum amount of material.

On the plate 11 near the center thereof is secured a receiving member 18, which is provided with a wedge-shaped opening 19 for receiving the upper end of the leg 16. If the supporting element is held up by three legs, then the receiving member 18 is provided with three openings, and if four legs are used, then four openings are provided in the receiving member 18.

The main body portion of the receiving member 18 is spaced away from the plate, as clearly shown in Figure 2 of the drawings.

The receiving member 18 may be riveted to the plate 11.

The upper end of the leg 16 will rest against the underside of the plate 11, which is covered up by the receiving member 18, as clearly shown in Figure 2 of the drawings.

In the practical use of my invention, the leg 16 has its upper end extended into the opening 19, whereby the leg 16 will be held to the supporting element by means of the pivotal or link connection 14 and the receiving member 18.

The greater the pressure upon the supporting element 10, the tighter the upper end of the leg will be locked or held relative to the receiving member 18.

In this connection, it may be mentioned that the upper end of the leg 16 is placed into the larger portion of the opening 19, and as pressure is applied upon the supporting element, it will cause the upper end of the leg to go in the direction indicated by the arrow 20 in Figure 2, forcing the upper end of the leg into the narrower portion of the opening 19.

When it is desired to move the leg to inoperative position, it is pulled in the direction indicated by the arrow 21, until the upper end thereof is no longer received in the receiving member 18.

The leg 16 and the link 14 may then be moved to the position shown in dotted lines in Figure 2 of the drawings.

In order to limit the amount of movement of the link 14 in the direction indicated by the arrow 21, I provide a stop member 22. The stop member 22 is formed by punching a tongue from the plate 11. When the legs 16 are arranged in pairs, then a cross piece 23 may be used for connecting them together, whereby the pair of legs may be operated in unison.

The operation of the leg locking structure is very simple and yet very efficient and is so arranged that it becomes more firmly locked in position by the pressure applied upon the top of the supporting element. It will be understood that by the term "supporting element", I mean any suitable table top, ironing board top, or counter or the like.

Some changes may be made in the construction and arrangement of the various parts of my device, without departing from the essential features and purposes of my invention, and it is my intention to cover by my claims, any modified forms of structure or use of mechanical equivalents, which may be reasonably included within their scope.

I claim as my invention:

1. A leg locking structure for supports or the like including a supporting element, an inclined leg, a pivotal connection for securing the leg to the under side of said supporting element, a receiving member on the under side of the supporting element having a tapered opening therein, said leg being designed to have its upper end project into said tapered opening in said receiving element whereby it will be held in position by the pivotal connection and said receiving member, the structure being such that the greater the pressure upon the supporting element the tighter the leg will lock in position as specified.

2. A leg locking structure for supports or the like including a supporting element, an inclined leg, a pivotal connection for securing the leg to the under side of said supporting element, said pivotal connection including a link secured to said support and to said leg, said link being curved in cross section for partially receiving the leg therein when the same is in inoperative position, a receiving member having a wedge shaped opening therein mounted on the under side of the supporting element, said leg being designed to have its upper end project into the opening in said receiving element whereby it will be held in position by the pivotal connection and said receiving member, the structure being such that the greater the pressure upon the supporting element the tighter the leg will lock in position as specified.

Des Moines, Iowa, November 24, 1922.

ERNEST S. JOHNSON.